United States Patent [19]

Dickinson

[11] Patent Number: 4,566,826
[45] Date of Patent: Jan. 28, 1986

[54] ADJUSTABLE INSERT SUPPORT

[76] Inventor: Lawrence C. Dickinson, 2255 Eva Adams, Reno, Nev. 89504

[21] Appl. No.: 581,390

[22] Filed: Feb. 17, 1984

[51] Int. Cl.⁴ ............................................. B23P 15/34
[52] U.S. Cl. ........................................ 407/37; 407/41; 407/16; 407/49
[58] Field of Search ................................ 407/36–42, 407/46, 49, 85; 144/230

[56] References Cited

U.S. PATENT DOCUMENTS

| | | | |
|---|---|---|---|
| 899,608 | 9/1908 | Newbold | 407/46 |
| 2,751,006 | 6/1956 | Lane | 407/85 |
| 3,481,015 | 12/1969 | Bogner | 407/46 |
| 3,675,290 | 7/1972 | Mayer | 407/46 |
| 3,847,555 | 11/1974 | Pegler et al. | 407/46 |
| 4,092,082 | 5/1978 | Severson | 407/46 |

FOREIGN PATENT DOCUMENTS

| | | | |
|---|---|---|---|
| 0037692 | 3/1981 | European Pat. Off. | |
| 48142 | 5/1966 | Fed. Rep. of Germany. | |
| 2806079 | 3/1979 | Fed. Rep. of Germany | 407/49 |
| 136010 | 6/1979 | Fed. Rep. of Germany. | |
| 3036527 | 9/1980 | Fed. Rep. of Germany. | |
| 2221221 | 3/1973 | France. | |
| 2446692 | 9/1979 | France. | |
| WO/8002812 | 12/1980 | PCT Int'l Appl. | 407/41 |

Primary Examiner—Leonidas Vlachos
Attorney, Agent, or Firm—Townsend & Townsend

[57] ABSTRACT

An apparatus for supporting a cutting insert is disclosed. A rotatable head includes at least one peripheral slot which has a generally flat bottom and a pair of parallel sides. The parallel sides of the slot are tilted relative to the bottom so that the bottom of the slot forms an acute corner with one side and an obtuse corner with the other side. An insert seat is provided which has a bottom and a back side which meet at an acute angle conformed to the acute corner of the slot. The seat has a front side with a recess to support the cutting insert in a general radial posture relative to the rotatable head. The seat is secured to the slot with the back side of the seat flush with the side of the slot forming the acute corner. The location of the bottom of the seat relative to the bottom of the slot is adjustable. A wedge is forced between the insert and the side of the slot forming the obtuse corner to confine the insert between the wedge and the seat.

8 Claims, 5 Drawing Figures

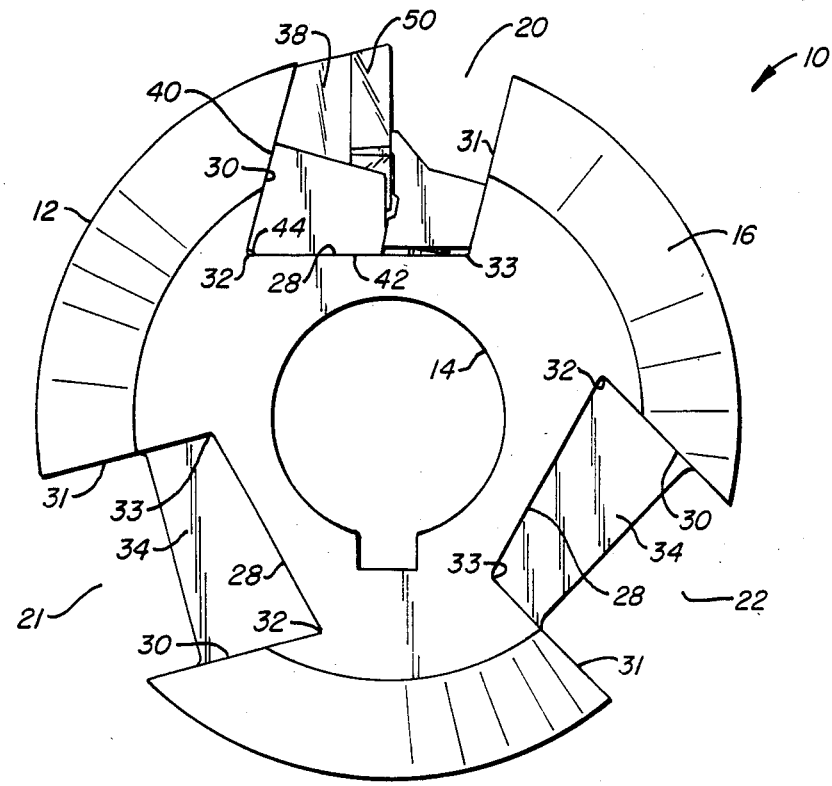
FIG._1.
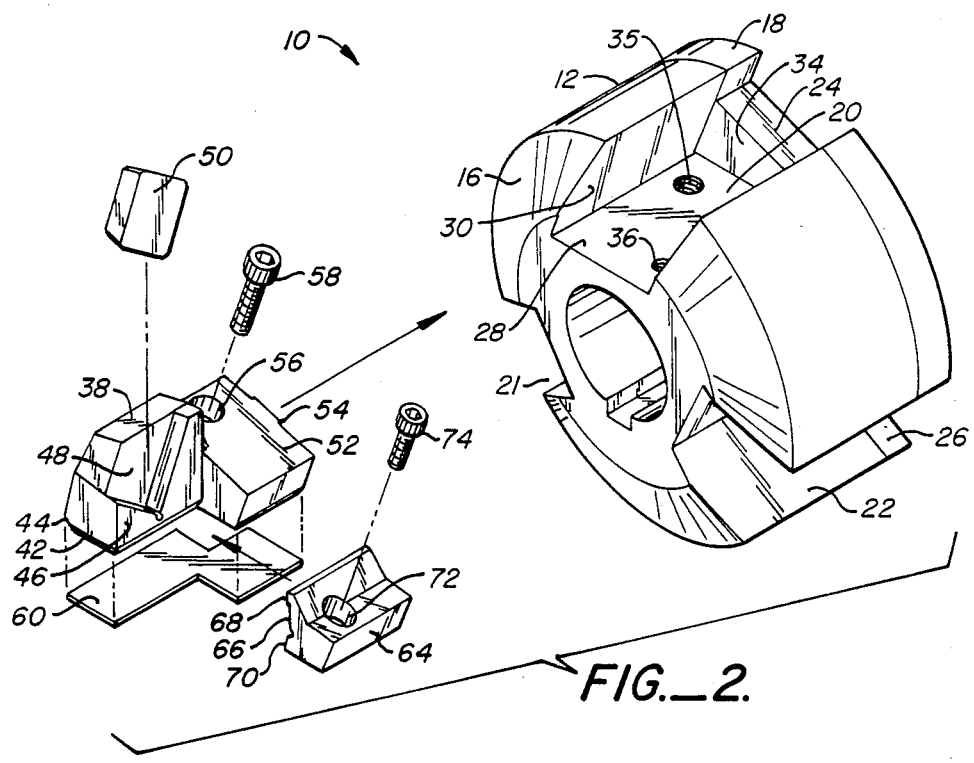
FIG._2.

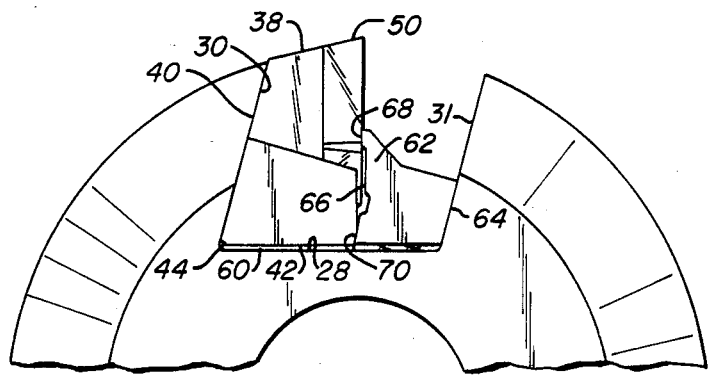
FIG._3.
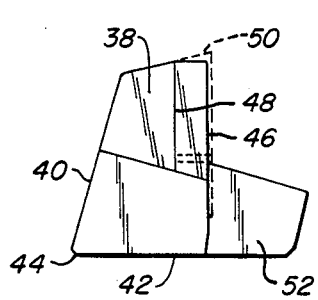
FIG._4.
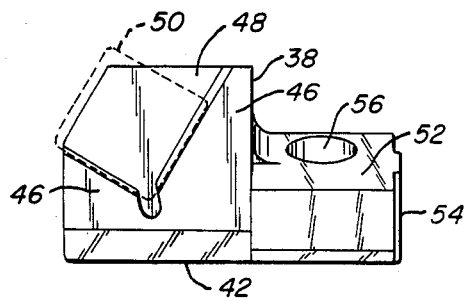
FIG._5.

ADJUSTABLE INSERT SUPPORT

BACKGROUND OF THE INVENTION

The present invention relates to a radially adjustable support for a cutting insert which is primarily useful in boring applications. The support of the present invention may also be used in milling and other types of cutting tool operations.

Conventional milling tools often employ a milling head which has circumferentially spaced V-shaped slots. Each slot contains a seat which holds an insert parallel to one surface of the slot. A wedge is located between the other surface of the slot and the insert to hold the insert in position.

In milling operations, as the cutting insert wears, it is usually possible to move the location of the tool to account for the reduced diameter of the cutting edge. In boring operations, where the inner diameter of the bore is determined by the outer diameter of the cutting inserts, wear of the cutting inserts results in a different bore diameter. Accordingly, in boring operations, it is necessary to adjust the position of the cutting inserts, or replace them prematurely, to obtain a repeatable and constant boring diameter.

With the V-shaped slots used in milling heads, the radial position of the cutting insert cannot be adjusted. If the seat is moved radially outwardly, the distance between the insert and the far side of the slot increases, and the wedge will not engage the insert at the proper location, or perhaps not at all. The use of V-shaped slots for mounting cutting tools in milling heads has been found to be extremely useful, but because of the lack of radial adjustablity, this type of mounting system has not been used in boring tools.

SUMMARY OF THE INVENTION

The present invention provides apparatus for supporting a cutting insert. A cylindrical rotatable head defining an axial and a radial direction includes at least one peripheral slot which has a generally flat bottom and a pair of parallel sides. The parallel sides of the slot are tilted relative to the bottom so that the bottom of the slot forms an acute corner with one side and an obtuse corner with the other side. An insert seat is provided which has a bottom and a back side which meet at an acute angle conformed to the acute corner of the slot. The seat has a front side with a recess to support the cutting insert in a general radial posture relative to the rotatable head. The seat is secured to the slot with the back side of the seat flush with the side of the slot forming the acute corner. The location of the bottom of the seat relative to the bottom of the slot is adjustable. A wedge is forced between the insert and the side of the slot forming the obtuse corner to confine the insert between the wedge and the seat.

Unlike the prior art, in which the slot has a V-shape, the slot in the apparatus of the present invention has a shape resembling three sides of a parallelogram. In order to achieve a V-shaped space between the insert and the far side of the slot so that the wedge can be used, the seat has a bottom and a back side which meet at an acute angle. Thus, the desired V-shape for the wedging action is provided by the seat, rather than the shape of the slot.

With the present invention, shims may be inserted beneath the seat of increasing thickness to move the insert outwardly as it wears, or merely to achieve a different diameter. Because the sides of the slot are parallel, the wedge engages the insert at the same position on the insert even though the seat and insert have been moved outwardly, and the appropriate wedging action to hold the insert in place is achieved. Thus, the system may be used in boring tools where a constant outer diameter for the insert must be maintained, without the premature replacement of cutting inserts. Furthermore, the present invention may be advantageously employed in milling and other types of operations because the adjustability of the radial position of the cutting insert avoids the necessity of making other adjustments to compensate for tool wear.

The novel features which are characteristic of the invention, as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not limited as a definition of the limits of the invention.

BRIEF DESCRIPTION OF THE DRAWINGS

FIG. 1 is an elevation view of the preferred embodiment of a tool head incorporating the present invention, with a cutting insert mounted in one of the slots;

FIG. 2 is an exploded perspective view of the embodiment of FIG. 1;

FIG. 3 is a fragmentary view similar to that of FIG. 1 showing radial adjustment of the insert;

FIG. 4 is an end elevation view of the seat of the embodiment of FIG. 1; and

FIG. 5 is a side elevation of the seat of the embodiment of FIG. 1.

DESCRIPTION OF THE PREFERRED EMBODIMENT

The preferred embodiment 10 of the insert support of the present invention is illustrated generally by way of reference to FIGS. 1 and 2 in combination. Insert support 10 includes a rotatable head 12 with interior aperture 14 for mounting the head on a rotatable, driven shaft. Head 12 includes two joined sections, a main section 16 and a back section 18 which together form the rotatable head.

Three circumferentially spaced slots 20-22 are formed in the main section 16 of head 12, and corresponding shallower slots such as 24, 26 are located in back section 18. Each slot 20-22 has a flat bottom 28, and a pair of parallel sides 30, 31. Sides 30, 31 are tilted relative to the bottom 28 of each slot 20-22, so that the shape of the slot when viewed axially resembles three sides of a parallelogram. Side 30 and bottom 28 of each slot meet at an acute angle to form what is referred to herein as an acute corner 32. Side 31 and bottom 28 of each slot 20-22 meet at an obtuse angle to form what is referred to herein as an obtuse corner 33. Each slot such as 24, 26 in back section 18 has corresponding parallel sides, but is more shallow to form a back face 34. Threaded holes 35, 36 are located in the bottom of each slot.

An insert seat 38 is mounted within each slot 20-22 in the main section 16 of head 12. As illustrated by the figures in combination, insert seat 38 has a back face 40 and a bottom face 42 which meet at an acute angle at corner 44, the angle of corner 44 being equal to that of the acute angle of acute corners 32. Each insert seat 38 has a front face 46 which is inclined relative to back face 40, and contains a recess 48 in which a cutting insert 50 may be supported. Insert seat 38 further includes a transverse portion 52 containing a rear face 54 and an aperture 56.

As illustrated in FIG. 1, insert seat 38 is mounted within one of the slots such as slot 20 with its back face 40 flush with side 30 so that its bottom 42 is parallel to or flush with the bottom 28 of the slot. In this position, insert 50 is maintained in a substantially radial posture relative to head 12. Rear surface 54 is flush with the back face 34 of back section 18, and a screw 58 projecting through aperture 56 and engaging threaded hole 35 locates the insert seat in position. If radial adjustment is necessary, a shim 60 is placed between bottom 42 of insert seat 38 and bottom surface 28 of the slot (see FIGS. 2 and 3), the thickness of the shim determining the radial position of insert 50.

To hold insert 50 in position, a wedge 62 is provided having a back surface 64 flush with side 31 of the slot, and a split front surface 66 having a top portion 68 adapted to rest against insert 50, and a bottom portion 70 adapted to rest against seat 38. Wedge 62 has a central aperture 72, and a screw 74 extends through aperture 72 and engages threaded hole 36.

To assemble the system of the present invention, the shim 60 providing the appropriate radial position for the cutting insert is selected, unless it is desirable to locate the bottom 42 of insert seat 38 flush with the bottom 28 of the slot. Screw 58 is then used to secure insert seat 38 in the appropriate slot, and the cutting insert 50 is mounted in recess 48. Wedge 62 is then inserted, and screw 74 is utilized to force the wedge downwardly, so that the upper portion 68 of front face 66 is pressed against insert 50 and holds the insert in position. Because the sides 30, 31 of the slot are parallel, the upper portion 68 of the front face 66 of wedge 62 will contact insert 50 at the same position no matter what radial spacing is given to insert seat 38 to firmly secure the cutting insert in position. As cutting insert 50 becomes worn during use, a larger shim 60 may be used to maintain the outer diameter of the cutting inserts.

While a preferred embodiment of the invention has been illustrated in detail, it is apparent that modifications and adaptations of that embodiment will occur to those skilled in the art. However, it is to be expressly understood that such modifications and adaptations are within the spirit and scope of the present invention, as set forth in the following claims.

What is claimed is:

1. Apparatus for supporting a cutting insert comprising:
  a cylindrical head having an axial and a radial direction and including at least one peripheral slot having a generally flat bottom and a pair of sides which are parallel to one another and tilted relative to the bottom when viewed axially so that the bottom of the slot forms an acute corner with one side and an obtuse corner with the other side;
  an insert seat having a bottom and a back side which meet at an acute angle conformed to the acute corner of the slot, said seat further having a front side with a recess in a generally radial posture, whereby the recess may receive the cutting insert;
  means for securing the seat in the slot with the back side of the seat flush with the side of the slot forming the acute corner with the location of the bottom of the seat relative to the bottom of the slot being adjustable;
  a wedge insertable between the insert and the side of the slot forming the obtuse corner; and
  means for forcing the wedge radially inwardly to confine the insert between the wedge and the seat.

2. The apparatus of claim 1 wherein the securing means comprises a shim overlying the bottom of the slot to radially adjust the position of the bottom of the seat, and a screw projecting through the seat and threadably engaging the head to secure the seat against the shim.

3. The apparatus of claim 1 wherein the slot includes a back face, and wherein the seat includes a rear face flush with the back face of the slot.

4. Apparatus for supporting a cutting insert comprising:
  a cylindrical head having an axial and a radial direction and including at least one peripheral slot having a generally flat bottom, a pair of sides which are parallel to one another and tilted relative to the bottom when viewed axially so that the bottom of the slot forms an acute corner with one side and an obtuse corner with the other side, and a back radial face;
  an insert seat having a bottom and a back side which meet at an acute angle conformed to the acute corner of the slot, a rear surface adapted to contact the back radial face of the slot, and a front side with a recess in a generally radial posture, whereby the recess may receive the cutting insert;
  shim means insertable between the bottom of the insert seat and the bottom of the slot to adjust the radial position of the insert seat;
  means for securing the seat in the slot with the back side of the seat flush with the side of the slot forming the acute corner and the bottom of the seat flush with the shim means;
  a wedge insertable between the insert and the side of the slot forming the obtuse corner; and
  means for forcing the wedge radially inwardly to confine the insert between the wedge and the seat.

5. The apparatus of claim 3 or 4 wherein the seat includes a transverse portion extending along the back face of the slot, and wherein the securing means includes an aperture in the transverse projection of the seat, and a screw projecting through the aperture and threadably engaging the head.

6. The apparatus of claim 1 or 4 wherein the wedge includes a split face, one portion of said face being forced against the seat and the other portion of said face being forced against the insert.

7. The apparatus of claim 1 or 4 wherein the wedge includes an aperture, and wherein the forcing means includes a screw projecting through the aperture and threadably engaging the head.

8. The apparatus of claim 1 or 4 wherein the head includes three peripheral slots for mounting three cutting inserts.

* * * * *